Patented Mar. 30, 1943

2,314,972

UNITED STATES PATENT OFFICE 2,314,972

PRODUCTION OF POLYMERIC COMPOUNDS

Henry Dreyfus, London, England, assignor to Celanese Corporation of America, a corporation of Delaware No Drawing. Application January 30, 1940, Serial No. 316,368. In Great Britain January 25, 1939

3 Claims. (Cl. 260—78)

This invention relates to improvements in the production of highly polymeric compounds and the manufacture of artificial filaments and other products therefrom.

I have discovered that synthetic highly molecular substances having a linear structure and containing amino groups or substituted amino groups in the side chains, which are very valuable for the production of artificial filaments, films and other shaped articles, may be obtained either by polymerising suitable nitrogen-containing compounds, either alone or together with other reactive compounds, or by introducing amino groups or substituted amino groups into suitable polymeric substances either at an intermediate stage of polymerisation or after polymerisation has been completed. When the amino or substituted amino groups are introduced into the polymeric compounds this may be effected either before or after conversion of the compounds into shaped articles.

One method of forming the nitrogen-containing polymers of the present invention consists in the substitution of hydroxy groups or other reactive groups or atoms, e. g. halogen atoms, in partially or completely polymerised products by amino or substituted amino groups. This method may be applied to the polymeric products either before or after their conversion into filaments or other articles. The substitution may be effected, for example, by heating a polymeric hydroxy compound with ammonia or a suitable amine in the gaseous or liquid state or the hydroxy compound may be first halogenated, for example by treating it with gaseous hydrogen chloride, thionyl chloride, or phosphorus pentachloride, and the halogenated product then reacted with ammonia or a suitable amine, for example a primary aliphatic amine. Again, compounds containing hydroxy groups may be esterified with toluene sulphonyl chloride or other aromatic sulphonyl halide and then reacted with ammonia or an organic base, either alone or in the presence of a diluent. This method is particularly suitable when it is desired to carry out the amidation step on filaments or other shaped products since the presence of sulphonic acid ester groups in the polymeric compounds in general improves their solubility in organic solvents and thus facilitates the production of the shaped articles by the extrusion of solutions of the polymers through shaping devices into setting media.

Examples of amines which may be employed in the production of the nitrogen-containing polymers are mono- and di-methylamines, ethylamines and propylamines, ethylene diamine and its α-α-dimethyl derivative, urea, thiourea, cyclohexylamine, piperidine, aniline and p-phenylene diamine. Compounds containing atoms or groups which are more reactive than the nitrogen-containing groups and which consequently yield polymers in which the nitrogen atom is not directly attached to the main chain may be employed. Halogenated amines, e. g. β-chlorethylamine, β-brom-propylamine, γ-chlor-butylamine and ε-chlor-amylamine, are particularly valuable for reacting with polymers containing free hydroxy groups or secondary amino groups in the chain. Compounds containing two reactive groups, e. g. ethylene diamine, are in general most valuable for the treatment of shaped articles, since they tend to yield insoluble products.

The heating of the polymerised products with the nitrogen-containing reactants may be effected at a temperature of e. g. 100° to 200° C. or 250° C. Diluents which may be employed include benzene, toluene, kerosene and anthracene oil. When shaped articles are treated any diluent employed must of course be one having no solvent or other detrimental action on the articles under the reaction conditions.

The products into which the nitrogen-containing radicles are introduced may be linear polymers containing in the chain e. g. acid amide groups, ether or thio-ether linkages or secondary or tertiary amino linkages. They may, for instance, be compounds having general formulae of the following types, where R represents a chain of carbon atoms

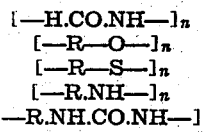

Methods for the production of such polymers and of other polymers which may be treated by the process of the present invention are described in U. S. applications S. Nos. 311,570, filed December 29, 1939, 311,932, filed December 30, 1939, and 316,366 and 316,367, both filed January 30, 1940.

Hydroxy-containing compounds which are amidated, for example, as described above, may have been produced from glycols, glycerine and other trihydroxy alcohols and alcohols containing more than three hydroxy groups, for example erythritol, sorbitol and the sugars, for example glucose and fructose, and derivatives thereof, for example sugar alcohols and sugar acids. Methods which may be employed for their production are described in my co-pending U. S. application S. No. 316,366 filed January 30, 1940, to which reference is made in this connection. When the production of the hydroxy-containing polymers by processes described in this application involves the use of a halogenated substance or other substance containing replaceable groups or atoms coupled with treatment of the polymerised body with water or other suitable agent to replace the halogen atoms or other reactive atoms or groups by hydroxy groups, it may be unnecessary to carry out this step and the production of the nitrogen-containing compounds of the present invention may be effected directly by treatment of the polymerised body containing halogen atoms or other reactive atoms or groups with ammonia or an organic base.

As an example of the above method for the production of the nitrogen-containing polymers may be mentioned the treatment of polymeric substances obtained from mixtures of halogenated ketonic acids and hydroxy aldehydes, for example a mixture of β-brom-laevulinic acid and glycol-aldehyde. These substances may be condensed by heating them, preferably under reduced pressure, and the halogen atoms may then be replaced by amino or substituted amino groups by heating the product with ammonia or a suitable organic base. In general the condensation of a ketonic acid with a hydroxy aldehyde results in the formation of an unsaturated compound and, if desired, this compound may be further halogenated before amidation.

The nitrogen-containing polymers of the present invention may also be obtained from starting materials containing two reactive radicals and amino or substituted amino groups. Examples of compounds which may be employed as starting materials are the amino derivatives of glycerol, erythritol, sorbitol, glucose and other aldoses, fructose and other ketoses, sugar-alcohols, sugar-acids, for example laevulinic acid, and other polyhydroxy alcohols. Self-etherification of these substances or etherification between two or more of these substances may be effected by heating them, preferably in the presence of a suitable catalyst such as zinc chloride, phosphoric acid or hydrogen chloride. Preferably all the hydroxy groups but two in the sugars or other compounds are blocked, for example by esterification, as otherwise there is a tendency for cross linkages to be formed with the production of polymeric compounds which may be too infusible and insoluble to be suitable for the manufacture of artificial filaments and other products. After completion of polymerisation the ester groups may, if desired, be removed by hydrolysis and some or all of the hydroxy groups substituted by amino or substituted amino groups.

Amino derivatives of aldoses, e. g. glucosamine, may also be caused to polymerise by heating them with potassium hydroxide, potassium carbonate or potassium cyanide or with potassium cyanide containing a small proportion of ammonia.

Highly polymeric compounds may also be produced according to the present invention by esterifying amino derivatives of sugars and other polyhydroxy alcohols with dicarboxylic acids or derivatives thereof, for example acid halides. Preferably the amino derivatives are first partially esterified, for example with acetic anhydride, until only two unesterified hydroxy groups remain, and these partially esterified products are then reacted with the dicarboxylic acid or derivatives. Examples of amino derivatives which may be esterified in the above manner are mannamine and galaktamine.

Nitrogen-containing polymeric esters may also be obtained by esterifying glycols with dibasic carboxylic acids, one or both of which contain amino groups or substituted amino groups or groups or atoms capable of being replaced by amino or substituted amino groups, for example halogen atoms. Thus, for example, 1:3-dihydroxy-2-amino-propane or, preferably, a dimethyl derivative thereof, e. g. 1:3-dihydroxy-2-dimethylamino-propane may be heated with adipic acid or a glycol, for example 1:6-dihydroxyhexane, may be heated with α-aminosuccinic acid or α-aminogluteric acid. Preferably the reaction is carried out in the presence of a suitable catalyst, for example sulphuric acid or zinc chloride. Instead of employing the acid a suitable derivative thereof, for example an acid halide, may be used.

The production of the highly polymeric compounds is, as described above, in general effected by causing condensation of the reactants by heating them at a fairly high temperature, e. g. 150–250° C. or more, and under a low pressure, preferably in the presence of a suitable catalyst. At least in the later stage the pressure should be reduced to about 5 mms. of mercury or less and this stage may with advantage be effected in a molecular still. The reaction may be assisted by the presence of condensing agents, e. g. hydrogen chloride, sulphuric acid, or zinc chloride, and diluents or solvents may be present. Removal of water, hydrohalide acid or other by-product of the reaction may be assisted by passing nitrogen or other inert gas through the reaction mixture. It is in any case desirable to carry out polymerisation in an oxygen-free atmosphere in order to avoid or reduce the production of dark-coloured products. Preferably any traces of oxygen in the inert gas are removed e. g. by passing it through an alkaline solution of pyrogallol or through sodium hydrosulphite followed by sodium hydroxide. Preferably after this treatment it is dried, e. g. with calcium chloride, before it enters the reaction vessel.

The reaction is continued until a product is obtained which has filament- or film-forming properties and which has a molecular weight of 3,000–4,000 or more, e. g. 7,000, 10,000 or 12,000, and a melting point of 150–200° C. or more. Preferably the reaction is stopped while the product is soluble in organic solvents so that filaments and other shaped articles can be produced by the shaping and setting of a solution of the product in an organic solvent. Further polymerisation of the product may, if desired, be effected after the shaped articles are formed, in order to modify their properties, for example to render them insoluble in organic solvents.

The production of artificial filaments, films and other shaped articles from the highly polymeric compounds produced according to the present invention may be effected by dissolving the compounds in suitable solvents, for example acetone, dioxane, ether or benzene, and extruding them through a shaping device into a gaseous or liquid setting medium or by shaping the product itself in a plastic or molten condition. Artificial filaments and other products may be stretched during or after their production while in a plastic condition in order to increase their tenacity.

The properties of the highly polymeric products obtained according to the present invention may be modified by reacting them with suitable substances either before or after their conversion into shaped articles. For example, they may be reacted with ethyl chloride, dimethyl sulphate or other alkylating agent, with acidylating agents derived from polycarboxylic acids, for example phthalyl chloride or succinyl chloride, or with dihalogenated paraffins, for example dibromethane. Again, they may be reacted with sulphur-containing compounds, for example sulphuryl chloride or thionyl chloride. In general, these reagents, particularly those containing two reactive groups or atoms, tend to reduce the solubility properties of the highly polymeric compounds and are therefore preferably employed for the treatment of the shaped articles.

Having described my invention, what I desire to secure by Letters Patent is:

1. Process for the production of synthetic linear polymers of high molecular weight containing ether linkages in the main chain and nitrogen-containing radicles attached to the main chain, which comprises heating an organic compound which is a partially esterified amino derivative of a polyhydroxy compound and which contains two free hydroxy groups linked by a chain containing carbon atoms and a basic nitrogen-containing radicle attached to said chain, heating being effected in an oxygen-free atmosphere until a product having filament-forming properties is obtained.

2. Process for the production of synthetic linear polymers of high molecular weight containing ether linkages in the main chain and nitrogen-containing radicles attached to the main chain, which comprises heating an organic compound which is a partially esterified amino derivative of a polyhydroxy compound and which contains two free hydroxy groups linked by a chain containing carbon atoms and a basic nitrogen-containing radicle attached to said chain, heating being effected at a temperature between 150 and 250° C. in an oxygen-free atmosphere until a product having filament-forming properties is obtained.

3. Process for the production of synthetic linear polymers of high molecular weight containing ether linkages in the main chain and nitrogen-containing radicles attached to the main chain, which comprises heating an organic compound which is a partially esterified amino derivative of a polyhydroxy compound and which contains two free hydroxy groups linked by a chain containing carbon atoms and a basic nitrogen-containing radicle attached to said chain, heating being effected in an oxygen-free atmosphere until a product having filament-forming properties and an average molecular weight of at least 7,000 is obtained.

HENRY DREYFUS.

CERTIFICATE OF CORRECTION.

Patent No. 2,314,972.                                              March 30, 1943.

HENRY DREYFUS.

It is hereby certified that error appears in the printed specification of the above numbered patent requiring correction as follows: Page 1, second column, line 46, for the serial number "311,932" read --311,931--; and that the said Letters Patent should be read with this correction therein that the same may conform to the record of the case in the Patent Office.

Signed and sealed this 18th day of May, A. D. 1943.

Henry Van Arsdale,
                                        Acting Commissioner of Patents.

(Seal)

Certificate of Correction

Patent No. 2,314,972. March 30, 1943.

HENRY DREYFUS

It is hereby certified that error appears in the printed specification of the above numbered patent requiring correction as follows: Page 1, second column, line 36, in the formula, for

[—H.CO.NH—]$_n$  read  ]—R.CO.NH—]$_n$;

and that the said Letters Patent should be read with this correction therein that the same may conform to the record of the case in the Patent Office.

Signed and sealed this 23rd day of November, A. D. 1943.

[SEAL]

HENRY VAN ARSDALE,
*Acting Commissioner of Patents.*